(12) United States Patent
Zhu

(10) Patent No.: US 11,695,288 B2
(45) Date of Patent: Jul. 4, 2023

(54) PORTABLE WIRELESS CHARGING SYSTEM

(71) Applicant: Shou Qiang Zhu, Ontario, CA (US)

(72) Inventor: Shou Qiang Zhu, Ontario, CA (US)

( * ) Notice: Subject to any disclaimer, the term of this patent is extended or adjusted under 35 U.S.C. 154(b) by 103 days.

(21) Appl. No.: 17/346,101

(22) Filed: Jun. 11, 2021

(65) Prior Publication Data
US 2022/0399730 A1 Dec. 15, 2022

(51) Int. Cl.
*H01M 10/46* (2006.01)
*H02J 7/00* (2006.01)
*H02J 7/02* (2016.01)
*H02J 50/00* (2016.01)

(52) U.S. Cl.
CPC .......... *H02J 7/0044* (2013.01); *H02J 7/0013* (2013.01); *H02J 7/02* (2013.01); *H02J 50/005* (2020.01)

(58) Field of Classification Search
CPC ...... H02J 7/0044; H02J 7/0042; H02J 7/0013; H02J 7/02; H02J 50/005; H02J 50/10
USPC .......... 320/107, 108, 114, 115, 149
See application file for complete search history.

(56) References Cited

U.S. PATENT DOCUMENTS 8,688,037 B2 * 4/2014 Chatterjee ............. G06F 1/1632
320/107

FOREIGN PATENT DOCUMENTS

CN 216162420 U * 4/2022 ............ H02J 7/0042

* cited by examiner

*Primary Examiner* — Edward Tso
(74) *Attorney, Agent, or Firm* — Che-Yang Chen; Law Office of Michael Chen

(57) ABSTRACT

A portable wireless charging system may include a charging dock station; one or more portable charging units; a connecting piece having a plurality of connecting units; a charging surface; and a plurality of charging slots to charge the portable charging unit, wherein one side of the connecting piece is attached to one side of an electronic device that is being charged, and the other side of the connecting piece attaches to the portable charging unit; and the connecting units are configured to secure the electronic device and the portable charging unit to increase a charging efficiency when the electronic device is being charged.

7 Claims, 5 Drawing Sheets

PORTABLE WIRELESS CHARGING SYSTEM

FIELD OF THE INVENTION

The present invention generally relates to a wireless power charging system, and more particularly to a portable device or system to provide both regular cable charging and wireless charging to mobile electronic devices.

BACKGROUND OF THE INVENTION

Mobile phones are used for a variety of purposes, including keeping in touch with family members, conducting business, and having access to a telephone in the event of an emergency. Some people carry more than one cell phone for different purposes, such as for business and personal use. More recently, smartphones emerged to quickly replace traditional mobile phones. Simply speaking, smartphones are mobile phones equipped with more advanced computing capability and connectivity to perform much more tasks than basic mobile phones. More particularly, smartphones typically combine the features of a mobile phone with some other popular consumer devices, such as a personal digital assistant (PDA), a media player, a digital camera, or a GPS navigation unit. Modern smartphones may include more features including a touchscreen computer, a web browser and a plurality of application software ("Apps").

One of the most important concerns of smartphone users is the battery life. As stated above, modern smartphones can perform just like a mini computer, however, unlike computers that may be used with the power cords for most of the time, smartphone users usually carry the phones with them and the battery inside the phone may be a sole power source thereof. Therefore, it may be inconvenient for the users if the battery cannot last long enough and the smartphone may lose the portability if the user has to charge it often.

To solve the battery issues in smartphones and other mobile devices such as tablets, currently people take power banks with them to prevent the mobile devices from running out of battery. A USB cable is usually needed to charge the mobile device, so if the user forgets to bring the USB cable with him/her, the mobile device cannot be charged. Although some manufactures make power banks with USB cables irremovable therefrom, the aesthetics value of the power bank may be sacrificed, as well as the integrity and rigidness thereof.

There are also smartphones having internal components, so the phones can be charged wirelessly, literally without connecting to the charging dock through cables. However, all wireless power banks need to be plugged to the regular 110V power supply on the wall, and people still cannot wirelessly charge their mobile device(s) wherever and whenever they need to. The wireless power bank that still needs to be plugged to the power supply on the wall is not considered "portable" because people cannot use it on the go.

U.S. Pat. No. 8,432,129 to Lee et al. (hereinafter "Lee") disclosing a wireless charging system can optimize charging efficiency regardless of a location of a mobile terminal. More specifically, the wireless charging system wirelessly charges a mobile terminal using electromagnetic induction between a first coil included in a charging pad and a second coil included in the mobile terminal. The charging pad can detect a location of the mobile terminal on the charging pad. The Charging pad can move the first coil to correspond to the detected location of the mobile terminal; and supply power to the first coil and charging a battery. However, the power source of the wireless charging system, as shown in FIG. 1, is still from a power cord plugging to the wall, which may still be inconvenient for the user when the socket is not available. Therefore, there remains a need for a new and improved portable wireless power bank to overcome the problems stated above.

SUMMARY OF THE INVENTION

It is an object of the present invention to provide a portable power bank to wirelessly charge mobile devices and the portable power bank does not need to connect to the power source on the wall while charging the mobile device.

It is another object of the present invention to provide a portable power bank to wirelessly and more efficiently charge the mobile devices than traditional wired chargers.

It is a further object of the present invention to provide a portable power bank that can be tightly attached to the mobile device to increase charging efficiency.

Typical wireless charging system applies power to a charging apparatus including a coil therein, and charges a battery using an induced current generating in a receiver included in a mobile terminal, or a battery using a magnetic field generating in the coil in the charging apparatus. A portable power bank that is used to wirelessly charge a mobile device may include a wireless charging surface, a main case, a battery level indicator, a power control button and a charging electrode.

When in use, the user can simply dispose a mobile device, such as a cell phone with a contacting member onto the wireless charging surface, the cell phone can be charged within a few seconds. It is noted that the portable power bank is not connected or plugged into any power supply on the wall when charging the cell phone. In one embodiment, the contacting member can be a magnet to engage with a corresponding groove on the charging surface.

In one aspect, a portable wireless charging system may include a charging dock station, one or more portable charging units, a connecting piece, a charging surface and a plurality of charging slots to charge the portable charging unit if necessary. In one embodiment, the wireless charging system may further include a power plug to connect the charging dock station to a power source.

In one embodiment, one side of the connecting piece is attached to one side of an electronic device that is being charged, and the other side of the connecting piece can be used to attach to the portable charging unit. Namely, the connecting piece is configured to secure the electronic device on the portable charging unit when the device is being charged. It is important to note that the connecting piece has a plurality of connecting units located at four corners of the connecting piece. In an exemplary embodiment, the connecting unit is a magnet so when one side of the connecting piece is attached to the electronic device, the portable charging unit can actually be attracted to the electronic device by the magnetic force to secure the electronic device on the portable charging unit when being charged to enhance the charging efficiency. It is noted that current electronic devices are all equipped with wireless charging coil and power control circuit so the electronic devices can directly be charged with either the connecting piece or on the charging surface.

When in use, the connecting piece can be pasted on a back side of the electronic device. In another embodiment, the connecting piece can be disposed inside a protecting case of the electronic device. When the user wants to charge the electronic device with the portable charging unit, the user can simply move the electronic device close to the charging unit, and the portable charging unit will be attracted to attach and secure on the back side of the electronic device by the magnetic force generated by the connecting units (i.e. magnets) at four corners on the connecting piece, to start the charging process.

In another embodiment, the electronic device can be charged along with the portable charging unit on the charging surface. More specifically, the charging surface is configured to wirelessly charge either the portable charging unit or the electronic device. When in use, the user can simply put either the portable charging unit or the electronic device on the charging surface to charge. It is noted that the charging surface can also charge the portable charging unit and the electronic device at the same time when the portable charging unit is attached to the electronic device.

In a further embodiment, the portable wireless charging system may further include a portable power bank that can be used to charge the portable charging unit when there is no external power source to use the charging dock station, for example, when the user is travelling or driving. In one embodiment, the portable power bank can be charged on the charging surface before being used. In another embodiment, the portable power bank can be connected with a power cord to be charged through an external power source.

In still a further embodiment, the portable charging unit can be charged in the charging slot. The present invention is advantageous because the portable wireless charging system is convenient and can simultaneously charge either the electronic device itself, the portable power bank, or the portable charging units. Moreover, the electronic device and the charging unit can be tightly secured through the magnetic force generated from the connecting unis of the connecting piece to increase the charging efficiency.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Typical wireless charging system applies power to a charging apparatus including a coil therein, and charges a battery using an induced current generating in a receiver included in a mobile terminal, or a battery using a magnetic field generating in the coil in the charging apparatus. In one embodiment, a power bank in the present invention may include a battery; a coil configured to detect whether a receiver of a first mobile device is nearby and to emit electrical magnetic pulses to realize the wireless charging; a wireless charging modulator configured to take direct current from the battery, transform the direct current into alternate current pulses and send the alternate current pulses to the coil; and a power control circuit to manage usage of the battery.

The power control circuit has a power managing unit and a detecting unit, said power managing unit configured to raise a battery level of the battery to a predetermined charging level, and said detecting unit continuously monitoring battery levels of the battery and a battery in the mobile device respectively to determine whether to terminate the wireless charging of the mobile device.

Figure 1:
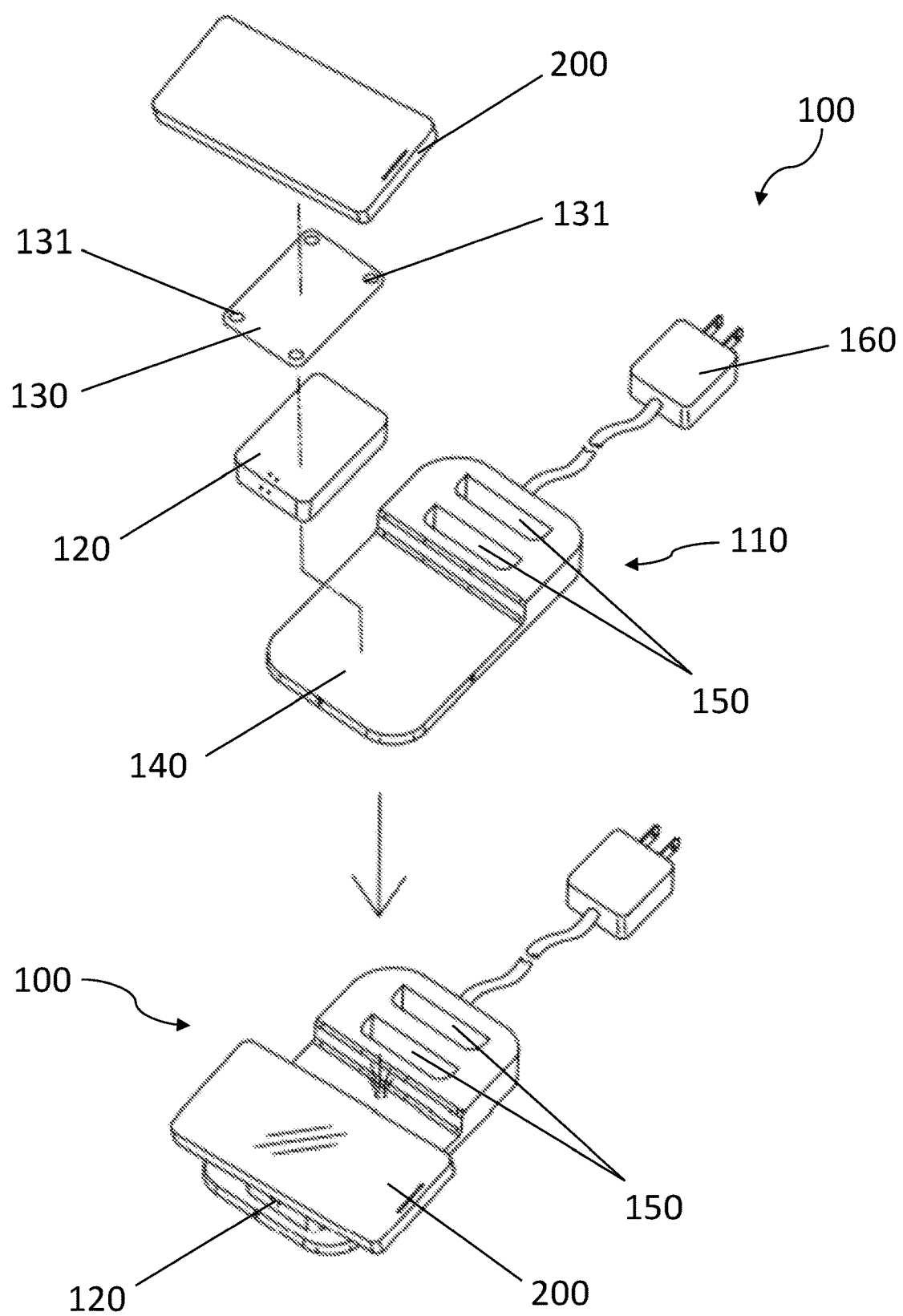
FIG. 1 is a schematic view of the portable wireless charging system in the present invention.

Referring to FIG. 1, a portable wireless charging system 100 may include a charging dock station 110, one or more portable charging units 120, a connecting piece 130, a charging surface 140 and a plurality of charging slots 150 to charge the portable charging unit 120 if necessary. In one embodiment, the wireless charging system 100 may further include a power plug 160 to connect the charging dock station 110 to a power source.

In one embodiment, one side of the connecting piece 130 is attached to one side of an electronic device 200 that is being charged, and the other side of the connecting piece 130 can be used to attach to the portable charging unit 120. Namely, the connecting piece 130 is configured to secure the electronic device 200 on the portable charging unit 120 when the device is being charged. It is important to note that the connecting piece 130 has a plurality of connecting units 131 located at four corners of the connecting piece 130. In an exemplary embodiment, the connecting unit is a magnet so when one side of the connecting piece 130 is attached to the electronic device 200, the portable charging unit 120 can actually be attracted to the electronic device 200 by the magnetic force to tightly secure the electronic device 200 on the portable charging unit 120 when being charged to enhance the charging efficiency. It is noted that current electronic devices are all equipped with wireless charging coil and power control circuit so the electronic devices can directly be charged with either the connecting piece 130 or on the charging surface 140.

When in use, the connecting piece 130 can be pasted on a back side of the electronic device 200. In another embodiment, the connecting piece 130 can be disposed inside a protecting case of the electronic device 200. When the user wants to charge the electronic device 200 with the portable charging unit 120, the user can simply move the electronic device 200 close to the charging unit 120, and the portable charging unit 120 will be attracted to attach and secure on the back side of the electronic device 200 by the magnetic force generated by the connecting units 131 (i.e. magnets) at four corners on the connecting piece 130, to start the charging process.

Figure 3:
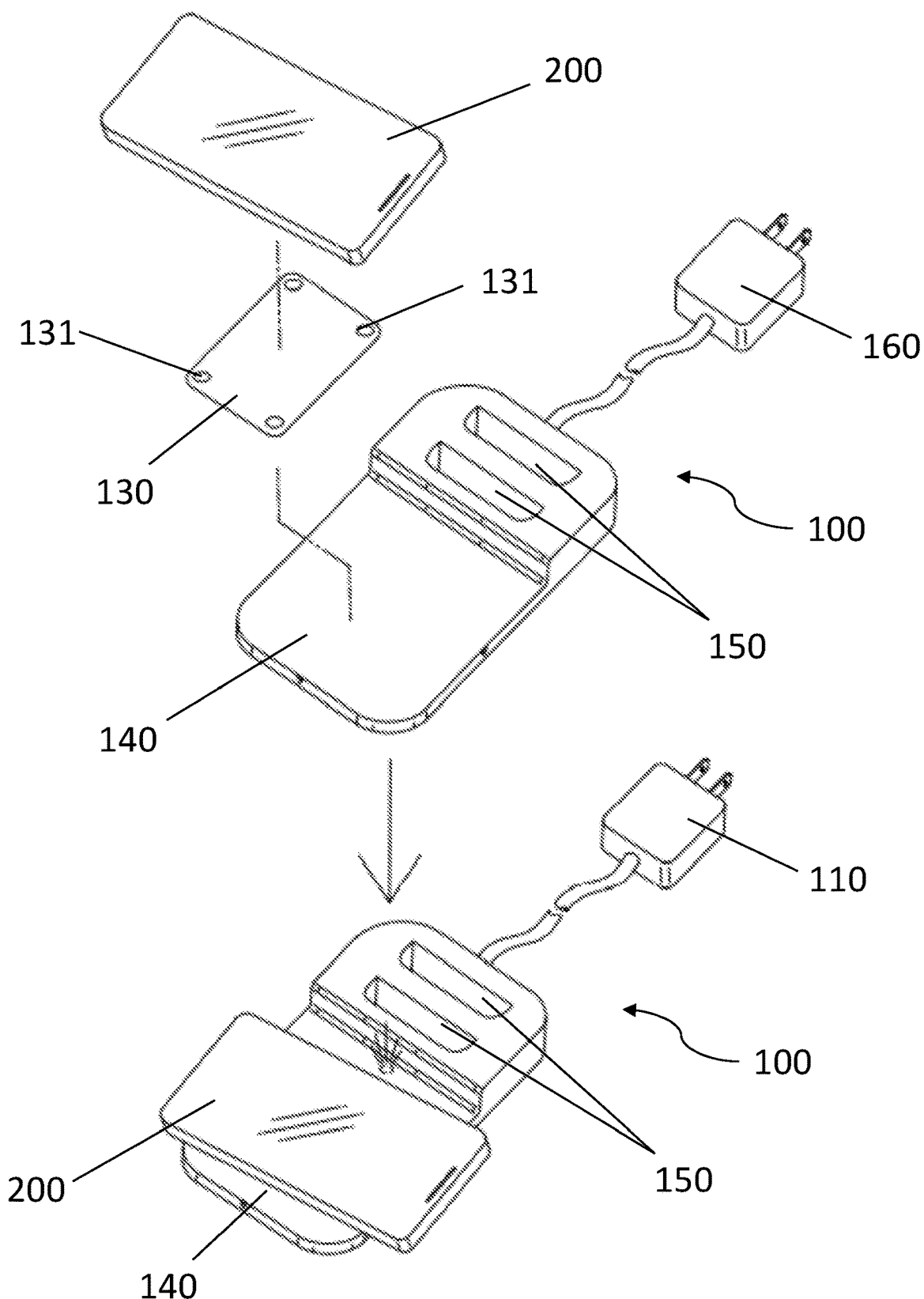
FIG. 3 illustrates a schematic view of another embodiment of the portable wireless charging system in the present invention.

In another embodiment, as shown in FIG. 1, the electronic device 200 can be charged along with the portable charging unit 120 on the charging surface 140. More specifically, the charging surface 140 is configured to wirelessly charge either the portable charging unit 120 or the electronic device 200. When in use, the user can simply put either the portable charging unit 120 or the electronic device 200 (as shown in FIG. 3) on the charging surface 140 to charge. It is noted that the charging surface 140 can also charge the portable charging unit 120 and the electronic device 200 at the same time when the portable charging unit 120 is attached to the electronic device 200 as shown in FIG. 1.

Figure 2:
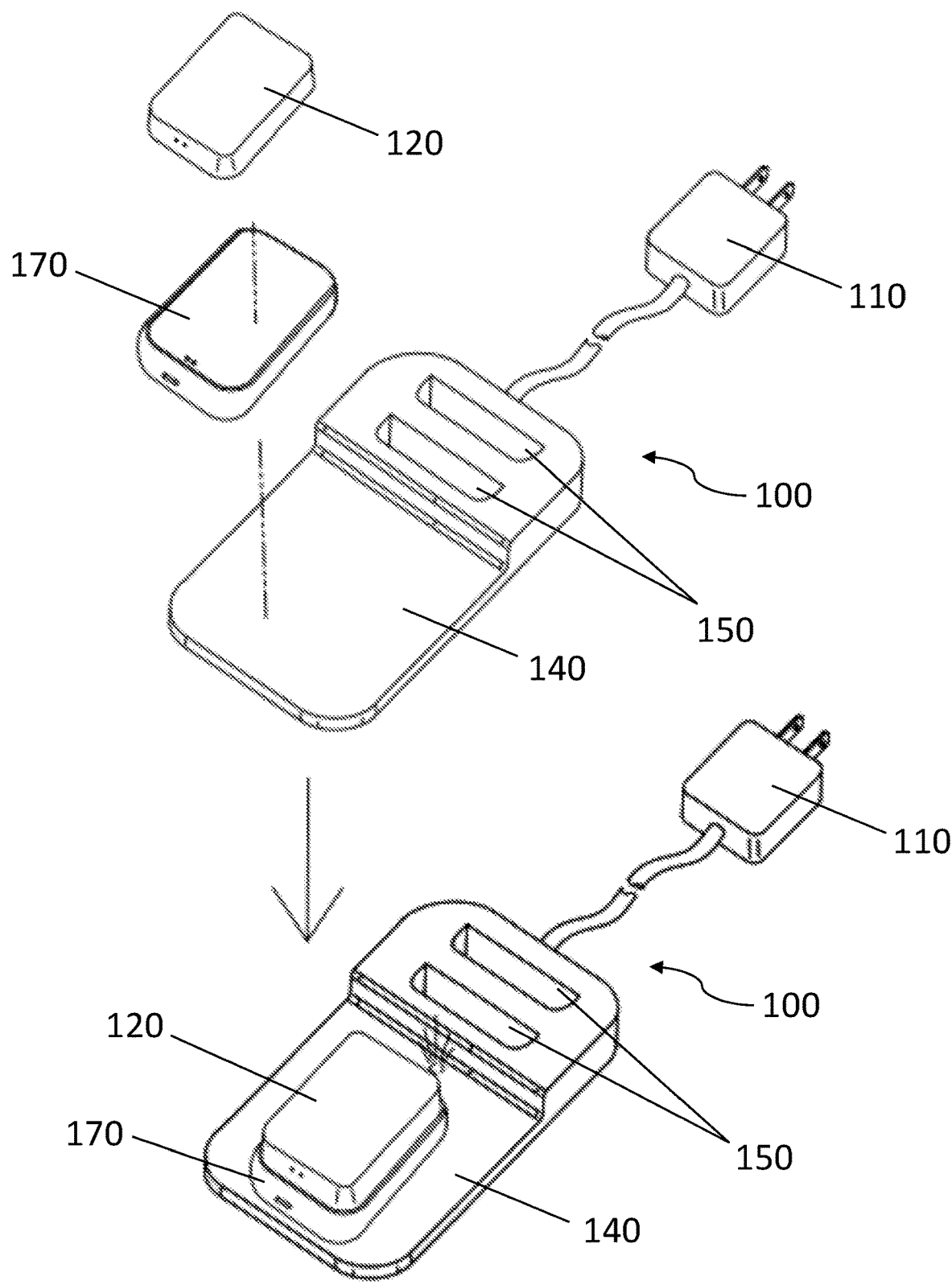
FIG. 2 illustrates a schematic view of one embodiment of the portable wireless charging system in the present invention.
Figure 5:
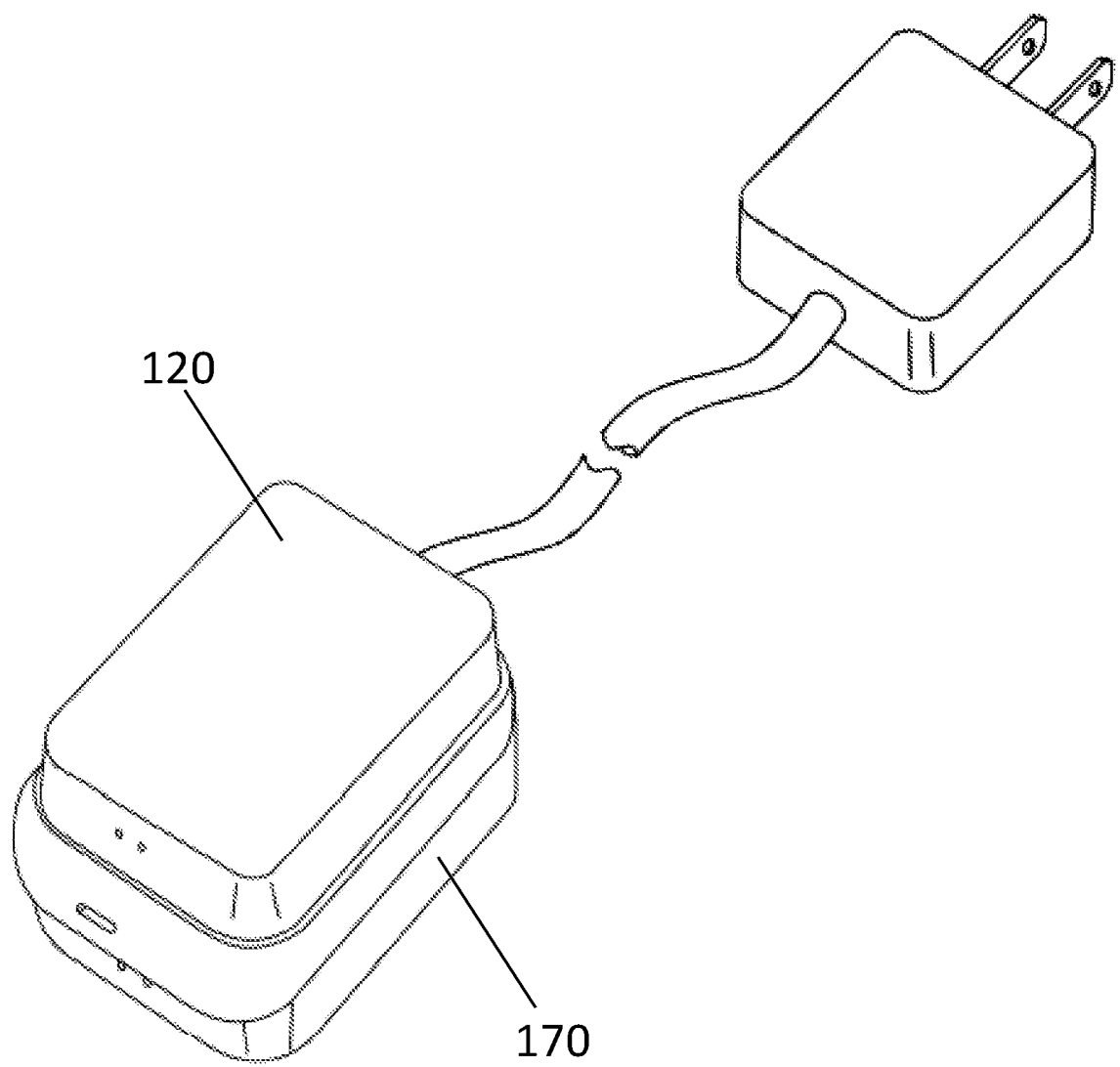
FIG. 5 illustrates a schematic view of the portable wireless charging system in the present invention illustrating the portable power bank charging the portable charging unit.

In a further embodiment, as shown in FIG. 2, the portable wireless charging system 100 may further include a portable power bank 170 that can be used to charge the portable charging unit 120 when there is no external power source to use the charging dock station 110, for example, when the user is travelling or driving. In one embodiment, the portable power bank 170 can be charged on the charging surface 140 before being used as shown in FIG. 2. In another embodiment, the portable power bank 170 can be connected with a power cord to be charged through an external power source as shown in FIG. 5 before being used.

Figure 4:
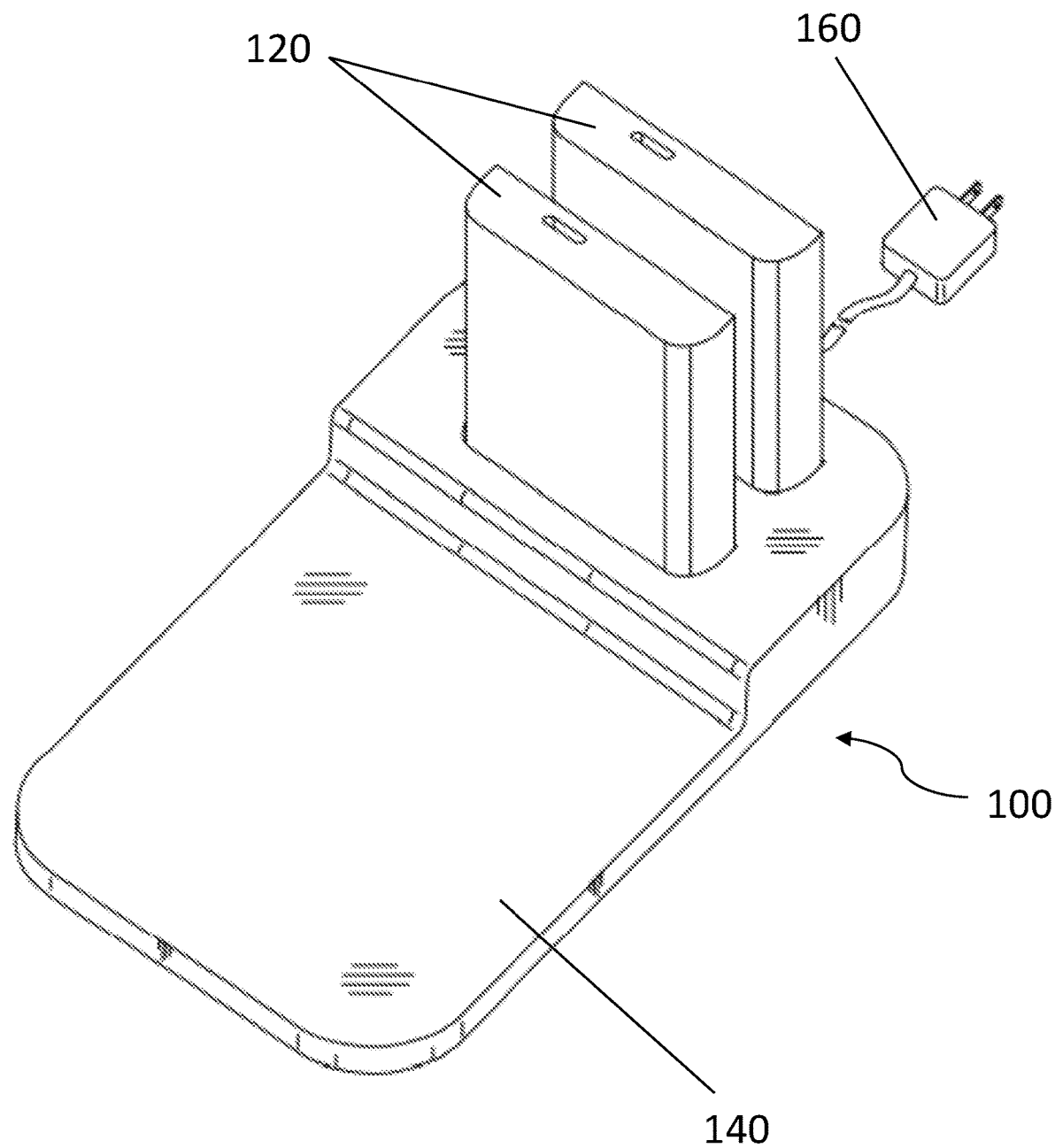
FIG. 4 is a schematic view of the portable wireless charging system in the present invention illustrating the portable charging units being charged in the charging slots.

In still a further embodiment, the portable charging unit 120 can be charged in the charging slot 150 as shown in FIG. 4. The present invention is advantageous because the portable wireless charging system 100 is convenient and can simultaneously charge either the electronic device 200 itself, the portable power bank 170, or the portable charging units 120. Moreover, the electronic device 200 and the charging unit 120 can be tightly secured through the magnetic force generated from the connecting unis 131 of the connecting piece 130 to increase the charging efficiency.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A portable wireless charging system comprising:
   a charging dock station;
   one or more portable charging units;
   a connecting piece having a plurality of connecting units;
   a charging surface; and
   a plurality of charging slots to charge the portable charging unit,
   wherein one side of the connecting piece is attached to one side of an electronic device that is being charged, and the other side of the connecting piece attaches to one of the portable charging units; and the connecting units are configured to secure the electronic device and said one of the portable charging units to increase a charging efficiency when the electronic device is being charged.

2. The portable wireless charging system of claim 1, wherein each of the connecting unit is a magnet and located at four corners of the connecting piece, and the electronic device and the portable charging unit can be secured by a magnetic force generated by the connecting units.

3. The portable wireless charging system of claim 1, wherein the charging surface is configured to wirelessly charge either the portable charging unit or the electronic device.

4. The portable wireless charging system of claim 1, wherein the charging surface is configured to charge the portable charging unit and the electronic device simultaneously when the portable charging unit is attached to the electronic device.

5. The portable wireless charging system of claim 1, the portable wireless charging system further comprising a portable power bank that is used to charge the portable charging unit.

6. The portable wireless charging system of claim 5, wherein the portable power bank can be charged on the charging surface.

7. The portable wireless charging system of claim 1, wherein the charging slot is configured to charge the portable charging unit.

* * * * *